Feb. 4, 1930.    G. ROBERTS ET AL    1,746,055
VALVE
Filed April 18, 1928

Inventor
Glen Roberts
Martinius Dysthe
By their Attorneys

Patented Feb. 4, 1930

1,746,055

UNITED STATES PATENT OFFICE

GLEN ROBERTS AND MARTINIUS DYSTHE, OF MINNEAPOLIS, MINNESOTA

VALVE

Application filed April 18, 1928. Serial No. 270,880.

Our present invention relates to an improved valve and more particularly to a regulating valve for general use, but especially adapted for use in an oil supply line to accurately meter a flow of oil to a burner, and has for its primary object to provide a valve with a maximum adjustable limit and slow feed.

To the above end, generally stated, the invention consists of the novel devices and combinations of devices hereinafter described and defined in the claims.

As a safety measure and particularly to reduce fire hazards, it is the recommendation of the National Board of Underwriters that the regulating valve in an oil supply line for an oil burner for heating purposes have a predetermined maximum flow. As all reputable firms installing oil burners try to follow this recommendation, it requires the use of a plurality of different sized valves for different sized burners and for burners adjusted for heating systems having different number of feet of radiation.

Our invention permits the use of a standard sized valve which may be very quickly and easily adjusted for a predetermined maximum flow and then re-adjusted for a decreased flow to produce the proper combustion for the particular oil burner. It will thus be seen that in case the valve is accidentally moved or operated by an irresponsible person to change its adjustment, said valve cannot be moved beyond a set position for a maximum flow.

This valve was passed as type A—1 by the National Board of Underwriters, 207 East Ohio Street, Chicago, Illinois, on February 28, 1928.

In the accompanying drawings, which illustrate the invention, like characters indicate like parts throughout the several views.

Referring to the drawings.

Figure 1:
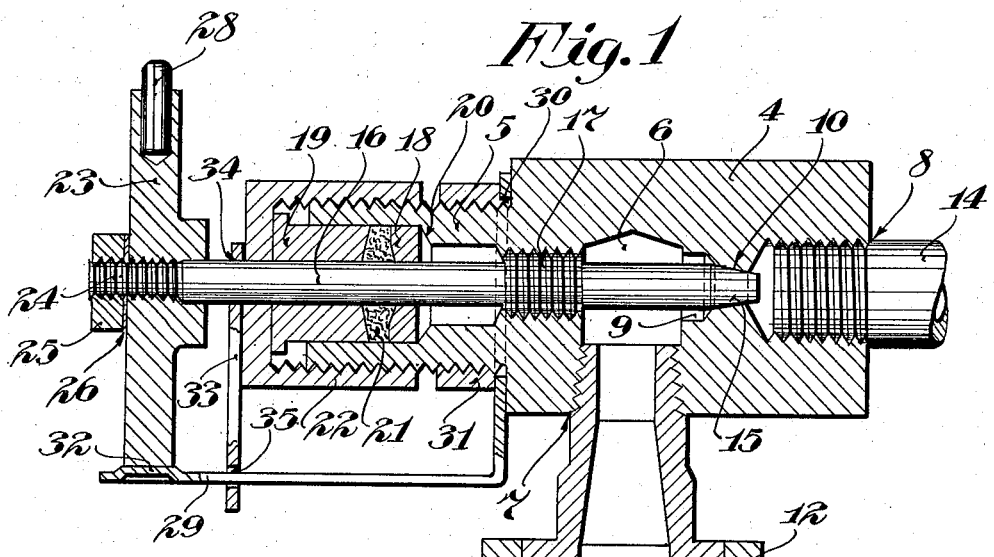
Fig. 1 is a view of the improved valve principally in central section.
Figure 2:
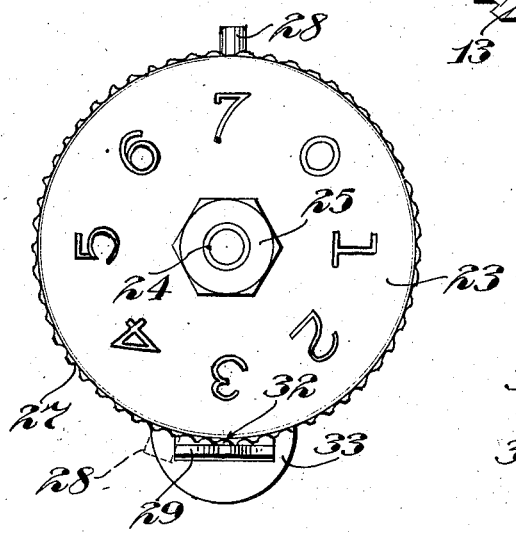
Fig. 2 is a face view of the indicator wheel.
Figure 3:
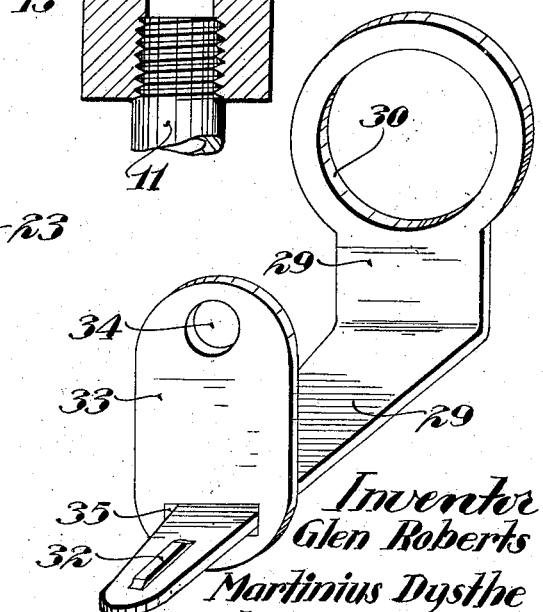
Fig. 3 is a perspective view of the relatively fixed maximum open position stop and shackle.

The improved valve includes a body member 4 having at one end an integrally formed stuffing box 5 having external screw threads. Said body member 4 and stuffing box 5 are formed from a piece of cold drawn brass commonly referred to as bar stock, thus eliminating all danger of sand holes, pin holes or leakage. Formed in the body member 4 is a valve chamber 6 to which leads from one side of said member an internal screw-threaded passageway 7. In the opposite end of the body member 4 from the stuffing box 5 is an internally screw-threaded discharge passageway 8. A port 9 connects the valve chamber 6 to the discharge passageway 8 and which port has a contracted or tapered section that affords a valve seat 10.

A supply pipe 11 which may be assumed to lead from an oil supply tank, not shown, is connected to the body member 4 by a union 12, one section of which is screwed into the passageway 7. Said union 12 is of standard make and has a ball and socket joint 13, the socket of which is of brass and insures a tight joint between the sections of said union without the use of a pliable packing. The receiving end of the pipe 14, which may be assumed to lead to an oil supply tank, is secured to the body member 4 by having its receiving end screwed into the passageway 8.

The movable member of the valve includes a needle point 15 formed on the inner end of a valve stem 16, which needle point extends through the port 9 from the valve chamber 6 for co-operation with the valve seat 10 to open or close said port. This valve stem 16 at its intermediate portion has screw-threaded engagement with the body member 4, as indicated at 17, and extends axially through the stuffing box 5 and outwardly thereof. Obviously, by operating the valve stem 16, the needle point 15 may be axially projected into contact with the seat 10 to close the ports 6, as shown in Fig. 1, or it may be axially retracted by reversely operating said valve stem to open said port.

Within the stuffing box 5 are inner and outer glands 18 and 19, the former of which has a press fit with said box and is seated on an internal shoulder 20 formed with said stuffing box. Interposed between the glands 18 and 19 and encircling the valve stem 16 is a pliable packing of asbestos or other suitable material 21. A cap nut 22 has threaded engagement with the external screw threads on the stuffing box 5, engages the outer gland 19 and holds the same moved toward the gland 18 to compress the packing 21 and form a tight joint between the stuffing box 5 and valve stem 16.

An indicator wheel 23 is applied to the outer end of the valve stem 16 and affords means by which the valve stem 16 may be turned to axially adjust the needle point 15. As shown, this indicator wheel 23 is detachably secured to the valve stem 16 by screw threads 24 and is held from becoming loose thereon by means of a lock nut 25 and a spring washer 26. Circumferentially spaced lock notches 27 are formed in the periphery of the indicator wheel 23 for a purpose that will presently appear.

Co-operating maximum open position stops 28 and 29 are provided for the indicator wheel 23 and hence the needle point 15. Said stop 28 is relatively movable and the stop 29 is relatively adjustable to vary the maximum flow through the port 9. The relatively movable stop 28, as shown, is in the form of a radially projected pin permanently secured in a bore in the periphery of the indicator wheel 23. The relatively fixed stop 28, as shown, is in the form of a flat L-shaped spring having at one end a large eye 30 through which the stuffing box 5 projects and holds said stop for adjustment about the axis of the valve stem 16.

A lock nut 31 on the stuffing box 5 normally impinges against the stop 29 and frictionally clamps the same onto the body member 4 and securely holds the same where set so that the same cannot be accidentally moved. The other end portion of the stop 29 extends parallel to the axis of the needle valve 16 and transversely across the indicator wheel 23 at the periphery thereof. This stop 29 is arranged to yield radially in respect to the indicator wheel 23 but is rigidly held in respect to movement circumferentially of said wheel.

A detent 32 is pressed from the inner face of the stop 29 for entrance into any one of the lock notches 27 to yieldingly hold the indicator wheel 23 where set. The tension of the stop 29 is such that the detent 32 will be cammed out of the engaged lock notch 27 under the rotation of the indicator wheel 23 and ride over the lock notches 27 until the indicator wheel 23 is stopped and then enter one of the lock notches and again hold the indicator wheel 23, where set.

To increase the tension of the stop 29 so that considerable pressure is required in turning the indicator wheel 23 to cam the detent 32 out of the lock notches 27, said stop is connected by a shackle to the valve stem 16. This shackle 33 is in the form of a flat plate having a bore 34 at one end through which the valve stem 16 projects and a rectilinear aperture 35 at its other end through which the free end portion of the stop 29 projects. Obviously, the shackle 33 by its connection to the valve stem 16 is free to turn about the axis of the valve stem 16 during the adjustment of the stop 29. The co-operating stops 28 and 29 are so arranged that the relatively movable stop 28 engages the relatively fixed stop 29 to positively limit the opening movement of the needle point 15 for a maximum flow through the port 9.

To set the relatively fixed stop 29 for a maximum flow the needle point 15 and the lock nut 31 are operated to release the stop 29 and permit the same to be set in different circumferential adjustments in respect to the indicator wheel 23. As shown, the outer face of the indicator wheel 23 is graduated into eight equal parts by the digits naught to 7, inclusive, circumferentially spaced around the axis of the indicator wheel 23. The lock notches 27 afford intermediate graduations between any two of the digits.

Before setting the stop 29 the operator decides on the maximum flow and then adjusts the needle point 15 accordingly. As shown in the drawings, the stop 29 is set in alignment with the numeral 3 on the indicator wheel 23 when the valve is closed and hence it takes substantially a movement of 180 degrees of the indicator wheel 23 to move the needle valve 15 to the maximum open position. If the operator should decide that the stop 29 should be set any number of notches beyond any one of the numerals on the indicator wheel 23 in order to secure the proper flow, he would first turn the stop 29 so that it is aligned with the respective numeral and then slowly move the same and count the clicks as the detent 32 drops into the lock notches 27, until the proper adjustment is obtained. By noting this reading, the needle valve 15 can easily be reset in case it gets out of adjustment.

After the stop 29 has been properly set with the needle point 15 closed, the lock nut is operated to rigidly secure the stop 29 to the body member 4 and hold the same where set. With the stop 29 thus secured, the needle point 15 can only be opened to a position in which the relatively movable stop 28 comes into contact with the relatively fixed stop 29 and limits further turning movement of the indicator wheel 23 and thereby determines the maximum flow through the port 9.

The purpose of the cavity between the screw-threads in the body 4 for the screw-threaded portion 17 on the valve stem 16 and the lower gland 18 is to receive said screw-threaded portion 17 in case the same is screwed completely out of its threaded engagement with the body 4 and thereby limit the retracting movement of the valve stem 16 and prevent the same from unseating or moving the lower gland 18 out of its set position. As previously stated, the lower gland 18 is secured in the stuffing box 5 by a press fit. It is important to note that the needle point 15 and its seat 10 have the same taper to produce a slow feed of oil to the pipe 14.

What we claim is:

1. A valve comprising a body member having a port, a rotatable member for opening or closing the port, an indicator wheel on the rotatable member, co-operating maximum open position stops for the rotatable member, one of which is secured to the indicator wheel and thus movable therewith, and the other of which is on the body member and fixed, said fixed stop being in the form of a spring arm yieldingly engaging the indicator wheel for holding the same where set and adjustable about the axis of the indicator wheel to vary the maximum flow, and a shackle for the spring arm.

2. A valve comprising a body member having a port, a rotatable member for opening or closing the port, an indicator wheel on the rotatable member, co-operating maximum open position stops for the rotatable member, one of which is on the indicator wheel and thus movable therewith and the other of which is in the form of a spring arm mounted on the body member for adjustment about the axis of the indicator wheel, said arm having contact with the indicator wheel for yieldingly holding the same where set, means for securing the stop on the body member in different adjustments and a shackle for the spring arm mounted to move therewith about the axis of the indicator wheel.

3. A valve comprising a body member having a port, a rotatable member for opening or closing the port, an indicator wheel on the rotatable member and having circumferentially spaced lock notches, co-operating maximum open position stops for the rotatable member, one of which is on the indicator wheel and thus movable therewith and the other of which is in the form of a spring arm mounted on the body member for adjustment about the axis of the indicator wheel, said arm having a detent co-operating with the lock notches to yieldingly hold the indicator wheel where set, means for securing the spring arm to the body member in different adjustments, and a shackle mounted to move with the spring arm about the axis of the indicator wheel and having an aperture through which the spring arm projects.

4. A valve comprising a body member having a port and a stuffing box, a rotatable member comprising a stem having screw-threaded engagement with the body member and on its inner end a needle point for opening or closing the port, said stem being extended through the stuffing box, an indicator wheel on the stem and having in its periphery circumferentially spaced lock notches, co-operating maximum open position stops for the needle point, one of which is on the indicator wheel and thus movable therewith and the other of which is in the form of a spring arm mounted on the body member and having an eye through which the stuffing box extends and holds said arm with freedom for adjustment about the axis of the stem, a lock nut on the stuffing box for securing the arm to the body member in different adjustments, said spring arm having a detent co-operating with the lock notches for yieldingly holding the indicator wheel where set, and a shackle for the spring arm mounted on the stem to swing about its axis and having an aperture through which the spring arm extends.

In testimony whereof we affix our signatures.

GLEN ROBERTS.
MARTINIUS DYSTHE.